J. B. Forsyth,
Rubber Roller for Clothes Wringers,
N° 59,580.      Patented Nov. 13, 1866.

Witnesses.
F. A. Jackson
J. A. Servin

Inventor.
James B. Forsyth
Per Munn & Co
Attorneys.

UNITED STATES PATENT OFFICE.

JAMES B. FORSYTH, OF ROXBURY, MASSACHUSETTS.

IMPROVEMENT IN THE MANUFACTURE OF INDIA-RUBBER ROLLERS.

Specification forming part of Letters Patent No. 59,580, dated November 13, 1866.

*To all whom it may concern:*

Be it known that I, JAMES B. FORSYTH, of Roxbury, in the county of Norfolk and State of Massachusetts, have invented a new and useful Improvement in India-Rubber Rollers; and I do hereby declare that the following is a full, clear, and exact description thereof, which will enable those skilled in the art to make and use the same, reference being had to the accompanying drawings, forming part of this specification, in which—

Figure 1:
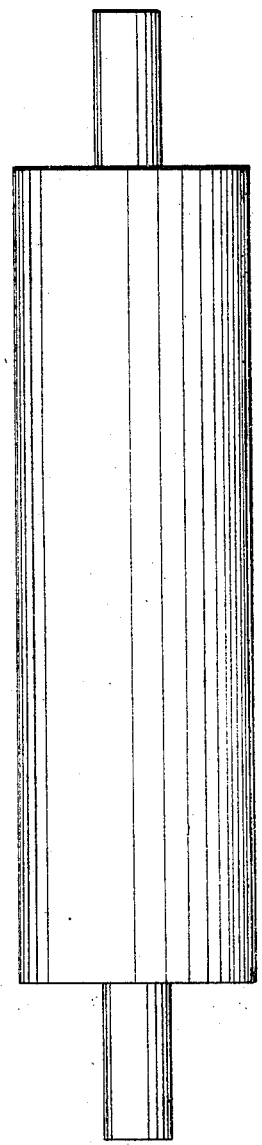
Figure 2:
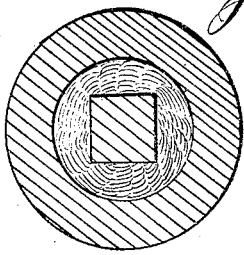

Figure 1 represents a side elevation of this invention. Fig. 2 is a transverse section of the same.

Similar letters of reference indicate corresponding parts.

This invention relates to a roller made of india-rubber or other vulcanizable material, the outside of which is soft and elastic, and the core or inside semi-elastic, said core being compounded of india-rubber, ground rubber rags, sulphur, oxide of zinc, calcined magnesia, and lamp-black, in such a manner that the cost of the roller is reduced; and, furthermore, a core is obtained which will expand when warm and contract and become firm when cold, and which will give a firm hold to the roller on its shaft.

The ingredients which I use for the core of my rollers are mixed together in about the following proportion: India-rubber, four pounds; rubber rags or fibrous material, four pounds; flour of sulphur, five pounds; white oxide of zinc, two pounds; calcined magnesia, one-eighth pound; lamp-black, one-fourth pound.

All these ingredients are intimately mixed by grinding them together or in any other suitable manner, and then the mass is cured in the usual manner. The compound thus obtained has the property that it will expand when heated and contract and become firm when cold, and on account of this property it is particularly fit for the core of rollers—such, for instance, as those generally used in clothes-wringers.

In making my improved roller, I first procure a suitable rod to form the size of the hole or opening wanted in the roller. I then wrap round this rod a sufficient number of plies or thicknesses of the semi-elastic composition to form the core or inside of the roll. Around this core I wrap a sufficient number of plies or thicknesses of soft or elastic stock to give the size of the roller and elasticity wanted. After this the roller is cut to the proper length and put into a flask or mold or on a suitable mandrel. The roller, either in the flask or on the mandrel, is then submitted to the vulcanizing process.

After vulcanization the two kinds of stock, soft or elastic and semi-elastic, will be found to be thoroughly and securely united together, and the whole mass of material is well cured.

The semi-elastic core or inside will thoroughly cure or vulcanize at the same heat and time it will take to cure the ordinary elastic rubber used for clothes-wringers and washer-rollers.

In order to put my improved roller on the shaft or mandrel, I first put the roller into hot or boiling water for fifteen to twenty minutes, to make the core soft and elastic, so it will expand to receive the shaft or mandrel, which may be fully one-sixteenth of an inch larger than the hole in the roller. I then put some rubber cement into the opening in the roll to facilitate the passage of the shaft or mandrel into the roll, and while the same is yet warm I force it on the shaft or mandrel. The semi-elastic core shrinks gradually as it cools, and when cold it will be found almost impossible to twist or turn the shaft in the roller.

What I claim as new, and desire to secure by Letters Patent, is—

A roller for clothes-wringers, &c., made substantially as herein described, as a new article of manufacture.

JAMES B. FORSYTH.

Witnesses:
E. W. WRIGHT,
F. N. PERKINS.